United States Patent [19]

Grè

[11] 4,080,818
[45] Mar. 28, 1978

[54] MACHINE FOR DRAWING METAL WIRE

[75] Inventor: Michel Grè, Saint Genis Laval, France

[73] Assignee: Sodetal-Societe Pour le Developpement du fil Metallique, Paris, France

[21] Appl. No.: 741,518

[22] Filed: Nov. 12, 1976

[30] Foreign Application Priority Data

Nov. 25, 1975 France .................. 75 36264

[51] Int. Cl.² .............................................. B21C 1/04
[52] U.S. Cl. .......................................... 72/278; 72/41; 72/281; 72/289
[58] Field of Search ................. 72/278, 280, 281, 286, 72/289, 41

[56] References Cited

U.S. PATENT DOCUMENTS

| 805,265 | 11/1905 | Cowles et al. | 72/289 |
|---|---|---|---|
| 1,248,107 | 11/1917 | Hathaway | 72/47 |
| 1,693,224 | 11/1928 | Darmstadt et al. | 72/280 |
| 2,606,650 | 8/1952 | Evans | 72/280 |
| 3,605,466 | 9/1971 | Kilcoin | 72/43 |
| 3,842,643 | 10/1974 | Large et al. | 72/286 |

FOREIGN PATENT DOCUMENTS 186,949  10/1922  United Kingdom ................ 72/281

Primary Examiner—Michael J. Keenan
Attorney, Agent, or Firm—Sherman & Shalloway

[57] ABSTRACT

A machine for drawing a plurality of metal wires including alternate odd-numbered wires and even-numbered wires, in which a plurality of drawing drums are rotatable in two parallel rows, each individual drum having a plurality of tracks at least equal to the number of wires to be drawn, the wire moving along a path which changes direction by extending successively from a drum in one row to a drum in the other row. A group of dies is arranged between each successive pair of drums, one die in each group serving for the passage of one of the wires. Two final drums are provided, and two sets of dies are arranged at different levels between the penultimate drums and the two final drums. One set and one final drum serves for the odd-numbered wires and the other set and the other final drum for the even-numbered wires.

3 Claims, 2 Drawing Figures

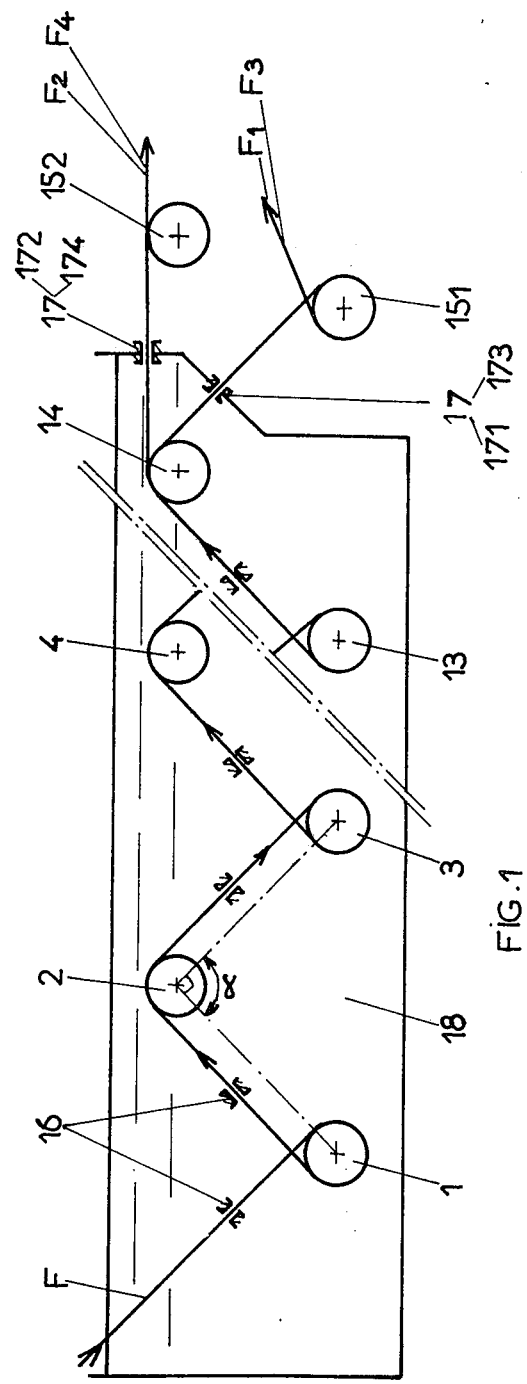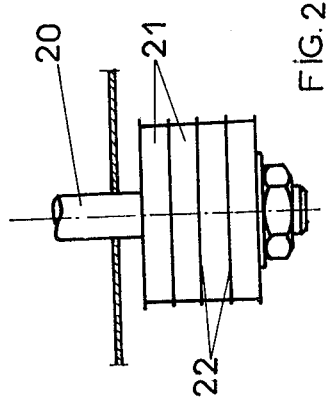

MACHINE FOR DRAWING METAL WIRE

The present invention relates to a machine for drawing metal wire such as for example that used for braided reinforcement means in the manufacture of tyre bodies or tyre coverings.

Wire-drawing is an operation which is carried out in several passes, i.e. by passing the wire through a series of dies, the diameter of each of which is smaller than that of the preceding die. The wire is drawn through the dies by drawing drums, the peripheral speeds of which increase progressively as the wire moves forward.

In one system of wire-drawing which is in use at present and is known as "wet wire-drawing," the dies and, in some cases, the drawing drums are not only sprayed but are immersed in a lubricating bath so as to increase cooling.

Wire-drawing machines can be divided into two classes, namely, the single-wire class which is the more widely used at present, and the multi-wire class, the use of which is on the increase. Cone-type wire-drawing mills exist wherein the drawing drums are constituted by rollers of different diameters which are securely mounted on one and the same shaft to form a stepped cylinder (or cone). The wire is looped around two sets of rollers carried by a pair of spaced and substantially parallel shafts, and the dies are located in the path of the runs of wire between the two sets of rollers.

The wire-drawing machine may comprise several pairs of cones, for example two. This type of wire-drawing machine offers the advantage of being very compact. On the other hand, that portion of the wire having the greatest diameter passes over the roller having the smallest diameter (i.e. the roller providing the lowest driving speed), and from the engineering point of view, this is not very logical.

There also exist wire-drawing machines having independent drawing drums wherein each drawing drum is formed by a roller firmly mounted on a shaft. The number of rollers provided is equal to the number of dies (or it may be one less than that number since the drawing drum for the last die may be constituted by the final on-winding spool). The rollers which may advantageously be of the same diameter are driven at different speeds. They may be disposed in any one of several arrangements: in line, in a circle, along a spiral, in ranks, in files etc. Generally, the wire can be passed along the rollers more readily than in the previously mentioned case, but the driving means are complicated by the need for driving a large number of rollers (15 for example) all at different speeds.

The multi-wire wire-drawing machines include cone-type machines which are based on the same principle as the single-wire machines but wherein each roller, instead of having one track, has several tracks, the number of which corresponds to the number of wires to be drawn. A machine for drawing three wires simultaneously is known which comprises cones formed by a set of three-track rollers carried on shafts which are inclined and not parallel. The inclined position of the shafts carrying the set of rollers is intended to facilitate the positioning of the wire. However, despite these structural arrangements, passage of the wire through the dies is not a simple matter. Furthermore, a limit is set by the number of rollers that may be mounted on each shaft, because of the overhung arrangement.

According to the present invention there is provided a machine for drawing a plurality of metal wires, including alternate odd-numbered wires and even-numbered wires, said machine comprising a plurality of drawing drums rotatable about parallel axes and arranged in two parallel rows, each individual drum having a plurality of tracks at least equal to the number of wires to be drawn, the drums defining a path of movement for the wires which changes direction by extending successively from a drum in one row to a drum in the other row, a group of dies arranged between each successive pair of drums, one die in each group serving for the passage of one of said wires, at least one final drum and two sets of dies arranged at different levels between the penultimate drum and said at least one final drum, one set being for the odd-numbered wires and the other set being for the even-numbered wires.

Such a machine is very compact and enables the wires to be positioned relatively easily.

The number of wires that are drawn is advantageously between two and six, four being preferred. Each die station is formed by a number of dies at least equal to the number of wires to be drawn and fitted in die-holders arranged side-by-side. Preferably, the two rows of individual drawing drums are horizontal. This arrangement is particularly advantageous in the case of machines for the wet drawing of wire wherein the dies and the drawing drums are submerged in a tank containing a lubricant.

The straight lines running from the centre-point of one individual drum to the centre-points of two adjacent individual drawing drums preferably form an angle of between 60° and 120°. This angle can be determined by the amount of space required to accommodate the drawing drums and the die holders, accessibility being taken into account. Said angle is preferably approximately 90°. It is also advantageous that the drawing drums in each row are spaced equidistantly, the gaps being the same in each row, and the drawing drums in the lower row being offset from those in the upper row by a distance equal to half the spacing between each two drums in a row.

The arrangement in accordance with the invention, which might be referred to as a "staggered arrangement," enables the length of the wire-drawing machine to be reduced as compared with that of a machine wherein the drawing druns are disposed along one and the same straight line.

Each individual drawing drum is preferably made up in a simple manner from a number of rings equal to the maximum number of wires to be drawn, these rings being solidly mounted on a driving shaft and separated by spacers. This arrangement permits the use of drawing drums having four tracks and more for four wires and more, while at the same time still enabling the drums to be slightly overhung. The degree of overhung is determined by the space between the wires which is preferably as small as possible but sufficient to permit the die-holders to be positioned between the wires. Thus, a machine of small width can be obtained.

Taking this small width into account, the invention makes use of a particular arrangement as regards the last die station and the final drawing drum station. In known manner, the final die or dies, known as the discharge die or dies and located at the outlet from the tank in the case of wet wire-drawing, is or are swivellable in all directions. This ability of said die or dies to swivel is necessary to effect complete straightening of the wire leaving the machine, i.e. to ensure that the path of travel of the wire between the penultimate and final drawing drums is exactly at right-angles to the die-holder. Since the system for permitting swivelling occupies a certain amount of space, the discharge dies are mounted in die-holders of greater volume than the normal die-holders. It is not possible to accommodate such die-holders in the normal gap between two wires as defined above. On the other hand, it is necessary for the particular number of wires, which it is generally intended to draw simultaneously, to be of exactly the same final length, since otherwise there arises the risk of slight curling during the next operation which may be that of stranding. This means that the wires should be of exactly the same length up to the point where they are wound on to their storage spools.

Advantageously, therefore, the final drawing drum station comprises two final drums for drawing the wires through the discharge dies. These two final drawing drums, as well as the discharge dies, are located at two different levels; one of them draws the even-numbered wires and the other the odd-numbered wires, the lengths of the wires being precisely identical for the two final drums. Since the wires are thus divided into two layers, the distance between two adjacent wires is doubled and this enables the swivellable discharge die-holders to be accommodated. After the group of wires has passed over the drawing drums, the wires are wound side-by-side on to the same storage spool or on to several spools, each receiving one or more wires.

Advantageously all the drawing drums of the machine are of the same diameter. With the exception of the final drawing drums which obviously rotate at the same speed, all the drums rotate at different speeds which progressively increase from drum to drum in the direction of forward movement of the wires. The drums are preferably driven by a single motor through a chain, through belts and/or gears and/or chains with reduction ratios for obtaining the required speed for each drawing drum.

The average discharge speed of the wires from the machine may be as high as 1000 meters per minute or more.

In order that the invention will be better understood, the following description is given, merely by way of example, reference being made to the accompanying drawings, in which:

FIG. 1 is a diagrammatic side elevation, in cross-section, of the drawing zone of one embodiment of wire-drawing machine in accordance with the invention; and FIG. 2 is an enlarged plan view of two of the drawing drums of the wire-drawing machine of FIG. 1.

FIG. 1 illustrates the drawing zone of a multi-wire drawing machine in accordance with the invention. The machine is designed to draw four wires simultaneously in fifteen passes. The four wires F are fed to the machine from four feed spools, not illustrated. The machine comprises fifteen common drawing drum stations. The first fourteen drawing-drum stations 1–14 (only some of which are illustrated) are each formed by a single four-track drum as illustrated in FIG. 2. Each common drum is made up of a set of rings 21, one for each track, mounted on a drive shaft 20 and separated by spacers 22. The rings and spacers are firmly held on the shaft, for example by keying and by means of a clamping nut. These common drawing drums are staggered in two rows — an upper row for the even-numbered drums and a lower row for the odd-numbered drums. The lines joining the centre-points of adjacent drums form an angle α of 90°. This arrangement enables the length of the machine to be reduced by $\sqrt{2}$ compared with that using drums arranged in a single straight line, while at the same time the die-holders and dies 16 are easily accessible. The drawing drums are all of the same diameter and are driven by a single motor through gears and chains, not illustrated, at speeds which increase progressively from drum to drum in the direction of movement of the wires while being drawn. The drawing drums 1–14, as well as the dies shown diagrammatically at 16, are submerged in a lubricant contained in a tank 18. For each pass, the dies 16 are mounted in die-holders in groups of four and arranged side-by-side.

At the final station there are two final drawing drums 151 and 152. Each of these final drums has two tracks, the drum 151 receiving the odd-numbered series of wires F1 and F3, and the drum 152 receiving the alternatively even-numbered series of wires F2 and F4. The self-aligning swivellable outlet dies 17 are mounted in two sets in die-holders arranged at two different levels. At the lower level are the dies 171 and 173 for the wires F1 and F3 drawn by the drum 151, and at the upper level are the dies 172 and 174 for the wires F2 and F4 drawn by the drum 152. These die-holders are readily accommodated since the space between two adjacent wires is thus doubled. The two groups of wires are then brought together again and are wound as a single group on to, for example, a conventional spool, not illustrated.

EXAMPLE OF OPERATION

Four steel wires having an initial diameter of 1.15 mm were drawn simultaneously in fifteen passes on the above-described machine. The reduction per pass was 21%, i.e. the cross-section of the wires was reduced by 21% at each pass. The inlet speed was 36 meters per minute, and the discharge speed was approximately 1000 meters per minute. Four wires were obtained with a diameter of 0.220 mm and drawn in the same conditions and having the same properties; these wires were found to behave in an identical manner in subsequent operations.

The embodiment of the invention that has been described offers the advantage of enabling four wires to be drawn simultaneously and of enabling four wires to be wound in a group on to the same spool. This spool can be used directly thereafter, for example on a four-wire stranding machine, thus an intermediate rewinding operation is eliminated. The machine is simple and does not occupy too much space, and the wires can be easily reached either for the purpose of initially positioning them or resuming drawing after breakage of a wire. A further advantage is that the wires do not need to be guided through the four-wire drawing machine with the aid of rollers or direction-changing means, normally fitted within the machine and submerged in the cooling bath, these rollers or guides suffering rapid wear and requiring considerable maintenance.

Various embodiments of the invention are obviously possible and these may involve a change in the number of wires drawn, in the number of passes used, which may vary over the range 14 to 21 for example, in the value of the angle α, which may be less than or greater than 90°, and in the construction of the drawing drums.

The present invention can be applied in the drawing of metal wires of all sizes and, in particular, in the drawing of wires for producing braided reinforcements for tyre bodies or tyre coverings.

I claim:

1. A system for drawing a plurality of metal wires including
    a plurality of common drums having parallel axes,
    each common drum having a plurality of tracks at least equal to the number of wires to be drawn,
    said common drums being positioned in staggered relationship in two parallel rows at two different levels,
    said common drums each engaging each of said plurality of wires and defining a staggered path for said wires from a first common drum to a last common drum,
    a first plurality of dies each positioned to engage one of said wires in its path between successive common drums,
    a pair of final drums adjacent said last common drum, said final rollers being positioned at different levels and equidistant from said last common drum, said final drums each having
    a number of tracks thereon, the total number of tracks of both final drums being at least equal to the number of wires to be drawn,
    the tracks of the final drums being aligned in the paths of alternate series of wires, whereby odd-numbered wires are engaged by one of said final drums while even-numbered wires are engaged by the other of said final drums, and
    a second plurality of dies at different levels each in the path of one of the odd and even series of wires passing from the last common drum to its respective final drum.

2. The system of claim 1 in which said second plurality of dies intermediate the last common drum and the final drum pair are self-aligning dies.

3. The system of claim 2 in which said common drums and said first plurality of dies are positioned in a lubricant tank.

* * * * *